United States Patent [11] 3,576,205

| [72] | Inventor | Robert A. Reich<br>1150 Eriewood Drive, Rocky River, Ohio 44116 |
|------|----------|---|
| [21] | Appl. No. | 837,543 |
| [22] | Filed | June 30, 1969 |
| [45] | Patented | Apr. 27, 1971 |

[54] WELDING NUT
6 Claims, 7 Drawing Figs.

[52] U.S. Cl. .................................................. 151/41.7, 85/32
[51] Int. Cl. .................................................. F16b 37/06
[50] Field of Search ......................................... 151/41.7; 85/32, (Digest)

[56] References Cited
UNITED STATES PATENTS
2,381,936  8/1945  Sargent ....................... 151/41.7

FOREIGN PATENTS
645,110  10/1950  Great Britain ................ 151/41.7
838,173  6/1960  Great Britain ................ 151/41.7

Primary Examiner—Edward C. Allen
Attorney—Owen and Owen

ABSTRACT: The present invention is a welding nut which is attached to a metallic surface by either spot welding or projection welding. The welding nut includes a nut end portion and a weld end portion of a predetermined thickness. The welding nut is constructed of a low-carbon steel and has a pilot projection which depends downwardly from the nut end portion a distance at least equal to the predetermined thickness of the weld end portion. A bore extends through the nut end portion and the pilot projection. Internal threads are provided in the bore.

PATENTED APR 27 1971
3,576,205
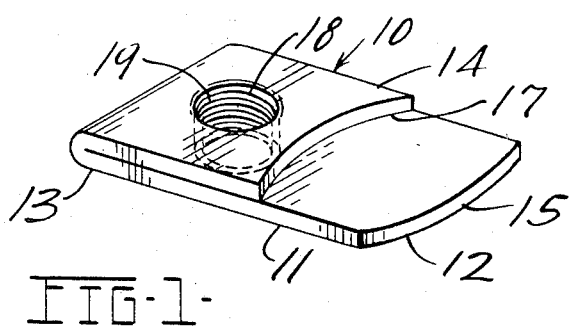
FIG-1-
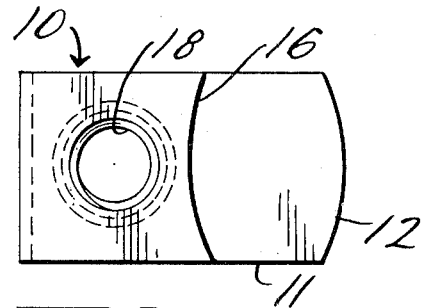
FIG-2-
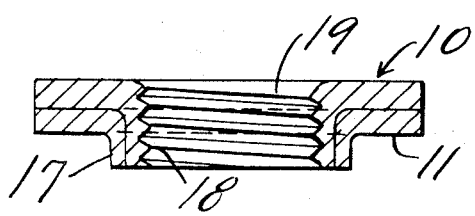
FIG-4-
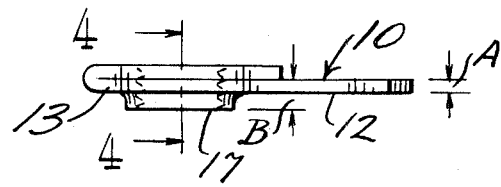
FIG-3-
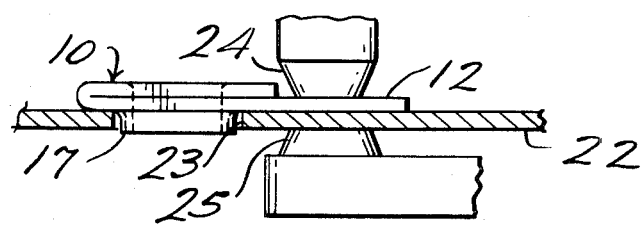
FIG-5-
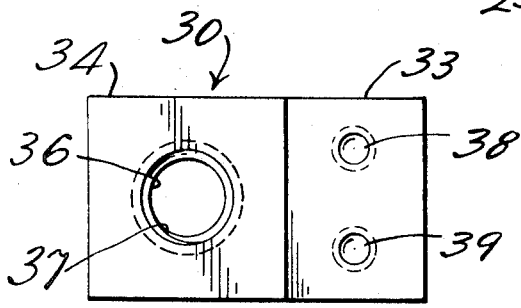
FIG-6-
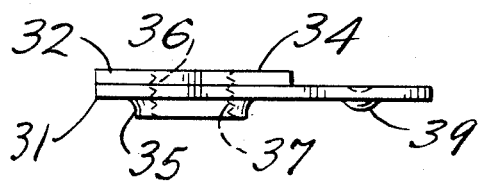
FIG-7-
INVENTOR:
ROBERT A. REICH.
BY
ATT'YS.

3,576,205

WELDING NUT

BACKGROUND OF THE INVENTION

This invention relates to a welding nut which is utilized in resistance welding generally and more specifically in projection welding and spot welding. Welding nuts are used in various sheet metal fabrication and are particularly adaptable for the high-production manufacture of office furniture, appliances and machinery.

Welding nuts are well known in the art. Many of the prior art welding nuts sacrifice welding efficiency to obtain the screw thread mechanical holding strength required. Such prior art welding nuts have extruded or punched pilot projections which define a bore which is provided with internal screw threads. To obtain the depth required in the pilot projection, the thickness of the welding nut in the area of the weld portion is increased. When the thickness is increased beyond the weld material design thickness, welding efficiency is reduced. Such a reduction in efficiency means that the heat, time and pressure parameters must be adjusted to insure a proper weld. This, of course, results in increased production costs.

SUMMARY OF THE INVENTION

The present invention is a welding nut which is normally attached to a piece of sheet metal or to a fabricated metallic component.

The welding nut includes a longitudinal body member of a predetermined thickness. The body member has a weld end and a nut end. A lap member overlies the nut end of the body member. A generally cylindrically shaped pilot projection depends downwardly from the body member. A central bore is defined through the pilot projection, the body member and the lap member and internal threads are provided within the bore.

It is the primary object of the present invention to provide an improved welding nut.

Other objects and advantages of the invention will become apparent from the following detailed description, with reference being made to the accompanying drawing.

BRIEF DESCRIPTION OF THE DRAWING

FIG. 1 is a perspective view of a welding nut, according to the present invention;

FIG. 2 is a plan view of the welding nut shown in FIG. 1;

FIG. 3 is an elevational view of the welding nut shown in FIG. 1;

FIG. 4 is a vertical sectional view taken along the line 4-4 of FIG. 3;

FIG. 5 is a fragmentary, partially diagrammatic elevational view, showing a welding nut, according to the present invention, during attachment to a sheet metal member;

FIG. 6 is a plan view showing another embodiment of a welding nut, according to the present invention; and FIG. 7 is a side elevational view of the welding nut shown in FIG. 6.

DESCRIPTION OF THE PREFERRED EMBODIMENTS

Referring to the drawing, a welding nut according to the present invention is generally indicated by the reference number 10. The welding nut 10 includes a longitudinal body member 11 of a predetermined thickness, designated A in FIG. 3. The body member 11 has a weld end 12 and a nut end 13. A lap member 14 overlies the nut end 13 of the body member 11. In the present embodiment, one elongated strip member is folded over on itself to form both the body member 11 and the lap member 14. Preferably, the body member 11 and the lap member 14 are constructed of a low-carbon steel or a low-carbon stainless steel. It has been found that low-carbon steel having a carbon content under 0.30 is suitable for a welding nut according to the present invention.

In the FIG. 1 embodiment, the weld end 12 has an outer edge 15 of an arcuate configuration. The lap member 14 has an inner edge 16 of an opposed arcuate configuration.

Referring to FIGS. 3 and 4, a generally cylindrically shaped pilot projection 17 depends downwardly from the body member 11. A central bore 18 extends through the pilot projection 17, the body member 11, and the lap member 14. A plurality of internal threads 19 are provided with the central bore 18. The pilot projection 17 includes an outer cylindrical layer which depends from the lower body member 11 and an inner layer which depends from the upper lap member 14. The inner layer is positioned adjacent at least a portion of the outer layer.

The pilot projection 17 depends downwardly from the body member 11 a distance, represented by B in FIG. 3, which is equal to or preferably exceeds the predetermined thickness A of the body member 11.

The internal threads 19 are sufficient to receive and secure a fastening bolt (not shown) which is utilized together with the welding nut 10 as a connecting or fastening assembly. The relationship between the length of the screw threads 19 and the predetermined thickness A of the body member 11 is an important consideration in the present invention. A predetermined number of internal threads 19 are necessary to provide proper fastening or mechanical holding strength. In most prior art welding nuts the thickness of the weld end was determined by the number of internal threads 19 needed. In these devices the thickness of the weld end usually resulted in poor welding efficiencies. The welding nut 10, according to the present invention, provides a proper number of internal threads 19 together with a predetermined thickness of the weld end 12 to insure good welding efficiencies. The table below indicates the maximum and minimum thicknesses of the weld end 12 (dimension A of FIG. 3) for various tap sizes. Another column in the table indicates the thickness of the welding portion of one prior art welding nut.

TABLE OF MATERIAL THICKNESS AT POINT OF WELD

| Tap size | One brand of prior art welding nuts (inches) | Welding nuts according to one embodiment of present invention (Dimension "A") (inches) | |
|---|---|---|---|
| | | Maximun | Minimum |
| 6-32, 6-40 | .078 | .045 | .040 |
| 8-32, 8-36 | .078 | .050 | .045 |
| 10-24, 10-32 | .094 | .060 | .050 |
| ¼-20, ¼-28 | .094 | .070 | .060 |
| ⁵⁄₁₆-18, ⁵⁄₁₆-24 | .125 | .085 | .075 |
| ⅜-16, ⅜-24 | .125 | .110 | .095 |

Referring to FIG. 5, a welding nut 10, according to the present invention, is shown being installed or connected to a piece of sheet metal 22. The piece of sheet metal 22 has a preformed opening 23. The pilot projection 17 is inserted in the opening 23. The weld end 12 of the welding nut 10 and the piece of sheet metal 22 are inserted between opposed welding tips 24 and 25. The welding tips 24 and 25 are utilized, of course, to spot weld the weld end 12 of the nut 10 to the piece of sheet metal 22. The design of the welding nut 10 results in good welding efficiencies.

Referring to FIGS. 6 and 7, another embodiment of the present invention is shown. In this embodiment, a welding nut 30 includes a body member 31 and a lap member 32. In this embodiment, the body member 31 and lap member 32 are constructed of separate pieces of low-carbon steel. The welding nut 30 includes a weld end 33 and a nut end 34. A pilot projection 35 depends downwardly from the weld end 33. Preferably, the pilot projection 35 depends downwardly from the body member 31 a distance which is equal to or exceeds the predetermined thickness of the weld end 33 of the welding nut 30.

A bore 36 extends through the lap member 32, the body member 31, and the pilot projection 35. The bore 36 is provided with internal threads 37. A pair of welding projections 38 and 39 extend downwardly from the weld end 33 of the welding nut 30. This embodiment is suitable for use in a projection welding operation.

It has been found that welding nuts, according to the present invention are adaptable to high rate and efficient production.

I claim:

1. A welding nut comprising, in combination, a longitudinal body member of a predetermined thickness, said body member having a weld end and a nut end, a lap member overlying said nut end of said body member, said lap member and said body member constructed of one piece of material which is folded over on itself one time, a generally cylindrically shaped pilot projection depending downwardly from said body member, said pilot projection including an outer layer which depends from said body member and an inner layer which depends from said lap member and is positioned adjacent a portion of said outer layer, said pilot projection depending downwardly from said body member a distance which is at least equal to said predetermined thickness of said body member, a central bore being defined through said pilot projection by said layers, and internal threads defined within said central bore.

2. A welding nut, according to claim 1, wherein said lap member and said body member are constructed of a low-carbon steel.

3. A welding nut, according to claim 1, wherein the outer edge of said weld end of said body member has an arcuate configuration and the inner edge of said lap member has an opposed arcuate configuration.

4. A welding nut, according to claim 1, including at least one welding projection extending downwardly from said weld end.

5. A welding nut, comprising an elongated strip member folded over on itself to form a weld end portion and a nut end portion, whereby said weld end portion comprises a single layer and said nut end portion comprises adjacent upper and lower layers, said strip member being formed of a low-carbon steel, said weld end portion being of a predetermined thickness, a projection depending downwardly from said nut end portion a distance in excess of such predetermined thickness, said projection including an outer cylindrical layer which depends from said lower layer and an inner layer which depends from said upper layer and is positioned adjacent a portion of said outer layer, a central bore being defined through said projection by said outer and inner layers, and internal threads defined within said central bore.

6. A welding nut, according to claim 5, wherein the outer edge of said weld end portion has a curved shape and the inner edge of said nut end portion has a reversed curved shape.